Aug. 8, 1939.  J. A. REEDY  2,169,165
WIND PROPELLED TURBINE MOTOR
Filed May 24, 1938  2 Sheets-Sheet 1

James A. Reedy INVENTOR
BY Victor J. Evans & Co.
ATTORNEYS

Aug. 8, 1939.  J. A. REEDY  2,169,165
WIND PROPELLED TURBINE MOTOR
Filed May 24, 1938   2 Sheets-Sheet 2

James A. Reedy INVENTOR
BY Victor J. Evans & Co.
ATTORNEYS

Patented Aug. 8, 1939

2,169,165

UNITED STATES PATENT OFFICE 2,169,165

WIND PROPELLED TURBINE MOTOR

James A. Reedy, White Hall, Md.

Application May 24, 1938, Serial No. 209,781

6 Claims. (Cl. 170—39)

My invention relates to improvements in motors and more particularly to wind propelled turbine motors.

One of the principal objects of my invention is to provide a wind propelled turbine motor equipped with a plurality of motor units so arranged and constructed as to be readily assembled together or disassembled whereby to increase or decrease the power output respectively.

Another object of my invention is to provide a device of the above described character wherein the frames of the units are so arranged and constructed whereby the units may be easily connected together.

A further object of my invention is to provide a device of the above described character which is simple in construction, efficient in operation, durable in use and economical in manufacture.

Other objects and advantages will be apparent from the following description, appended claims and annexed drawings.

Referring to the drawings wherein like reference characters designate like parts throughout the several views.

Figure 1:
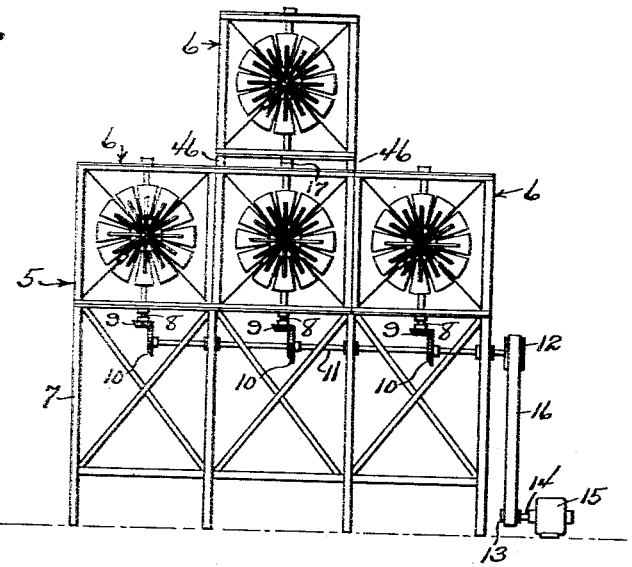
Figure 1 is a front elevation of my invention illustrating a plurality of motor units connected together.
Figure 2:
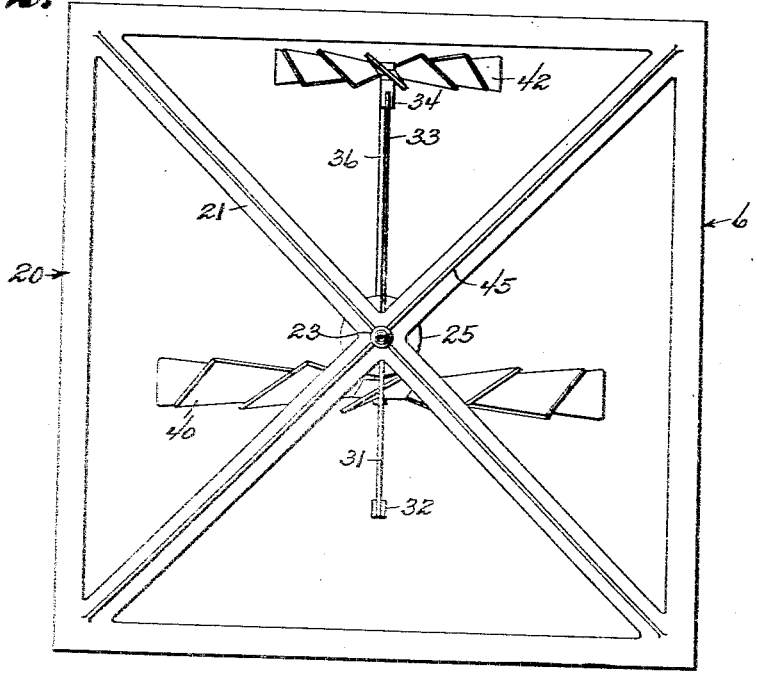
Figure 2 is a top plan view of one of the units.
Figure 3:
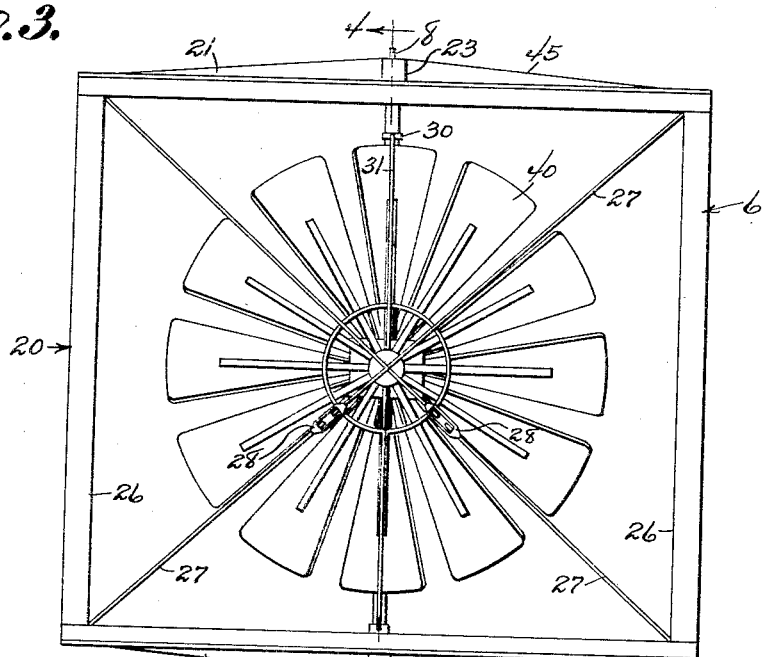
Figure 3 is an enlarged front elevation of the unit illustrated in Figure 2.
Figure 4:
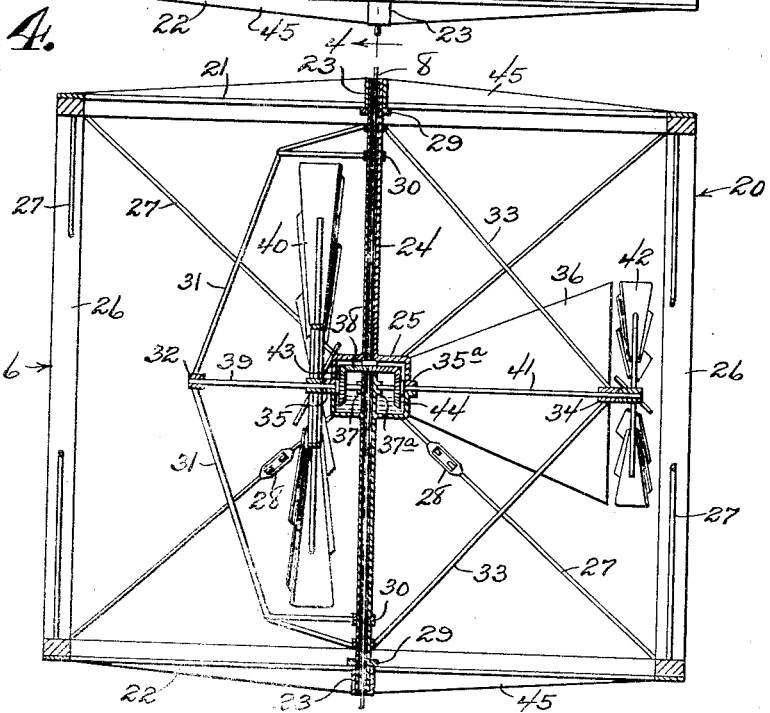
Figure 4 is a sectional view taken on the line 4—4 of Figure 3.

In practicing my invention I provide a wind propelled turbine motor 5 comprising a plurality of motor units 6 assembled together and mounted on a support frame 7. Each of the motor units 6 are provided with a drive shaft 8 and in the instance of the embodiment disclosed in Figure 1 the lower ends of the drive shafts of the lower units have fixed thereto bevel gears 9 meshing with like gears 10 fixed to a horizontally extending drive shaft 11 mounted in the frame 7. The outer end of the shaft 11 has fixed thereto a pulley 12 for driving a similar pulley 13 mounted on the shaft 14 of a generator 15, a belt 16 being employed for effecting driving connection between the pulleys 12 and 13.

The generator 15 is utilized for heating, lighting or other desirable purpose and it is to be distinctly understood, inasmuch as the generator forms no part of the invention, that the power units may be connected to other devices for operating the latter.

The upper end of the shaft 8 of the centrally disposed lower unit is connected to the superposed unit by means of a suitable coupling or sleeve 17 whereby to effect driving connections between their respective shafts of said units. Inasmuch as each of the units are of a like construction, a detailed description of one will suffice, the reference characters of parts of one unit being indicative of like parts of the other units.

The unit comprises a cuboid shaped frame 20 having upper and lower sections 21 and 22 respectively and which are formed with diagonal cross beams. Each of said sections are fashioned with a centrally disposed hub 23 in which is journalled the ends of a vertically extending tube 24 fashioned with a gear box 25 intermediate the ends thereof. The sections 21 and 22 are connected together in spaced relation by vertically extending columns 26 disposed at the corners. Between said columns each of the sides of the frame are provided with pairs of crossed tie rods 27, each equipped with a turnbuckle 28 for effecting tightening of said rods and rigidity of the frame.

Adjacent the hubs 23 the tube 24 has secured thereto collars 29 whereby to maintain said tube supported between the sections and prevent axial displacement of the tube relative to the frame. Adjacent the collars 29, the tube has fixed thereon a pair of oppositely disposed sleeves 30 secured to a front frame work 31 provided with a centrally disposed bearing 32. The sleeves 30 are also provided with a rear frame work 33 fashioned with a rearwardly and centrally disposed bearing 34. The front and rear walls of the gear box 25 are fashioned with outwardly extending bearings 35 and 35a respectively and the rear wall is fashioned with a rearwardly extending vane 36 for a purpose hereinafter described.

The lower section of the tube 24 extends interiorly of the gear box and is fashioned with a pair of oppositely disposed forwardly and rearwardly extending bearings 37 and 37a respective while the upper section of said tube terminates at the upper wall of the gear box thereby providing a space between the upper and lower sections of the tube 24 in which is disposed a bevel gear 38 fixed to the shaft 8 extending through the tube. Journaled in the bearings 32, 35 and 37 is a front propeller shaft 39 on which is mounted a windwheel 40 for driving the latter. Journaled in the bearings 34, 35a and 37a is a rear propeller shaft 41 having fixed to the rear end thereof adjacent the vane 36 a wind-wheel 42 of a lesser diameter than the wind-wheel 40 and of a larger diameter than the eye or distance between the inner ends of opposite blades of the latter. The shafts 39 and 41 have fixed thereon bevel gears 43 and 44 meshing with the bevel gear 38 on the drive shaft 8 whereby the shafts 39 and 41 are adapted to rotate in opposite directions, the blades of the respective wind-wheels being oppositely inclined.

The cross beams of the sections 21 and 22 are fashioned with ribs 45, the outer ends of which terminate short of the marginal edges of the sections whereby to permit spacing bars 46 to overlie and underlie the marginal edges of the respective units when in assembled condtion as illustrated in Figure 1.

The vane 36, arranged rearwardly of the gear box 25, is responsive to the directional flow of the wind to rotate the tube 24 within the hubs 23 and thus position the wind-wheels in the face of the wind whereby said wheels are caused to rotate in opposite directions by the air currents impinging upon the blades.

From the foregoing it will be apparent that I have provided a wind propelled turbine motor wherein the motor units are so arranged and constructed as to be readily assembled in any desired number or disassembled to increase or decrease the output power thereof.

What I claim is:

1. A device of the character described, comprising, a plurality of motor units connected together and each equipped with a drive shaft, a power take-off connected to said shafts, each of said units having a frame fashioned with upper and lower spaced sections connected together, a tube within said frame and extending around said drive shaft and formed with a gear box, front and rear frame works carried by said tube and equipped with bearings, front and rear propeller shafts journaled in said bearings and said gear box for rotation in opposite directions, wind-wheels mounted on said propeller shafts and the blades of the respective wind-wheels being oppositely inclined, and gearing within said gear box effecting connection between said propeller shafts and said drive shaft whereby to actuate said drive shaft upon rotation of said wind-wheels in opposite directions.

2. A device of the character described, comprising, a plurality of motor units connected together and each equipped with a drive shaft, a power take-off connected to said shafts, each of said units having a frame fashioned with upper and lower spaced sections connected together, a tube within said frame and extending around said drive shaft and formed with a gear box, front and rear frame works carried by said tube and equipped with bearings, front and rear propeller shafts journaled in said bearings and said gear box for rotation in opposite directions, wind-wheels mounted on said propeller shafts and the blades of the respective wind-wheels being oppositely inclined, gearing within said gear box effecting connection between said propeller shafts and said drive shaft whereby to actuate said drive shaft upon rotation of said wind-wheels in opposite directions, and a vane carried by said gear box and extending rearwardly thereof whereby to dispose said wind-wheels in the path of air flowing through said frame to actuate said wind-wheels.

3. In a wind propelled turbine motor, a frame, a drive shaft mounted in said frame for connection with a power take-off, spaced propeller shafts connected to said drive shaft for driving the latter upon rotation of said propeller shafts in opposite directions, spaced frame works carried about said drive shaft and equipped with bearings supporting ends of said propeller shafts, and wind-wheels mounted on said propeller shafts and the blades of the respective wind-wheels being oppositely inclined for operating the propeller shafts in opposite directions.

4. In a wind propelled turbine motor, a frame, a drive shaft mounted in said frame for connection with a power take-off, front and rear propeller shafts connected to said drive shaft for driving the latter upon rotation of said propeller shafts in opposite directions, front and rear frame works mounted about said drive shaft and equipped with bearings supporting the outer ends of said propeller shafts, and wind-wheels mounted on said propeller shafts and the blades of the respective wind-wheels being oppositely inclined for operating the propeller shafts in opposite directions.

5. In a wind propelled turbine motor, a frame, a drive shaft mounted in said frame for connection with a power take-off, spaced propeller shafts connected to said drive shaft for driving the latter upon rotation of said propeller shafts in opposite directions, spaced frame works carried about said drive shaft and equipped with bearings supporting ends of said propeller shafts, wind-wheels mounted on said propeller shafts and the blades of the respective wind-wheels being oppositely inclined for operating the propeller shafts in opposite directions, and a vane connected to one of said frame works to dispose said wind-wheels in the path of air flowing through said frame to actuate said wind-wheels.

6. In a wind propelled turbine motor, a frame, a drive shaft mounted in said frame for connection with a power take-off, front and rear propeller shafts connected to said drive shaft for driving the latter upon rotation of said propeller shafts in opposite directions, front and rear frame works mounted about said drive shaft and equipped with bearings supporting the outer ends of said propeller shafts, wind-wheels mounted on said propeller shafts and the blades of the respective wind-wheels being oppositely inclined for operating the propeller shafts in opposite directions, and a vane connected to one of said frame works to dispose said wind-wheels in the path of air flowing through said frame to actuate said wind-wheels.

JAMES A. REEDY.